Patented Jan. 6, 1942

2,268,913

UNITED STATES PATENT OFFICE 2,268,913

LEAD PIGMENT

Forrest L. Turbett and George J. Vahrenkamp, Joplin, Mo., assignors to The Eagle-Picher Lead Company, Cincinnati, Ohio, a corporation of Ohio No Drawing. Application August 22, 1939, Serial No. 291,378

8 Claims. (Cl. 106—297)

Our invention relates to a new lead pigment, characterized by its amorphous particle structure, white color, chemical reactivity in paint vehicles and paints made therefrom. The chief object of our invention is to provide a series of new and hitherto unknown white compounds of lead oxide-silicon dioxide and water whose compositions are chemically analogous to the well known basic carbonates and basic sulfates of lead, and with properties greatly superior to the older lead pigments chiefly in respect to the chalking, checking and tint retention deficiencies of the older pigments.

It is well known that the pigment portion of a large majority of the high grade outdoor paints in use today contain lead in varying proportions. The pigment portion of some paints consists entirely of lead pigment, while in others the lead pigment is mixed with other pigments such zinc oxide, zinc sulfide, titanium pigments, and certain extenders such as barium sulfate, asbestine or silica. It is generally accepted that paints containing lead in some form are better weathering paints than those free from lead and it appears that within reasonable limits the higher the percentage of lead the more weather resistant is the paint.

At the present time there are but two well known white lead pigments in general use, namely basic lead carbonate and basic lead sulfate. There are two varieties of basic lead sulfate, namely, the anhydrous variety known as sublimed white lead and consisting of lead oxide and sulfur trioxide in chemical combination in varying molecular proportions, and the wet processed basic lead sulfate which contains water combined in the composition. The chemical composition of anhydrous basic lead sulfate approximates the formula $2PbSO_4.PbO$ which is preferably written $3PbO.2SO_3$, although the composition may be varied as desired. The formula for the wet processed material is usually very close to $$3PbO.2SO_3.H_2O$$

Basic lead carbonate consists of lead oxide, carbon dioxide and chemically combined water, and generally has a composition approximating $3PbO.2CO_2.H_2O$. Like basic lead sulfate its molecular composition can be varied within fairly wide limits.

In the present invention we have produced in a new and novel manner a series of pigment compounds of lead oxide-silicon dioxide and water having molecular compositions ranging from $2PbO.SiO_2.H_2O$ to $3PbO.4SiO_2.H_2O$ and possibly even higher silica content. These compounds differ materially in composition, structure and properties from known compounds of lead oxide and silicon dioxide which have been precipitated from solution in that they have low combined water content, proper pigment particle size and shape, together with strong light refracting powers. We find that the compound in our new series which has shown the best all-round pigment properties up to the present is one having a molecular composition approximating $$3PbO.2SiO_2.H_2O$$

Like the older lead compounds, we find that there are optimum reactivities and pigment properties for certain specific purposes which are attained by regulating the chemical composition of the product. According to X-ray analysis our new pigments are amorphous in particle structure and this we believe is unique among white paint pigments.

When used in outside paints both of the older white lead pigments have some defects in spite of the fact that they are regarded as the best all-round pigments for outdoor use. The chief fault is their property of chalking after prolonged exposure and their ultimate failure usually is due to this property. They also tend to check in a characteristic manner, and where tints are used in the paint composition the tendency is for the color to change after a short exposure due to chalking.

Our new compounds are chemically more basic in properties than the older lead pigments, their pH in distilled water slurry ranging from approximately 8.0 to 11.0, depending upon composition. As a result they react readily with commercial types of paint vehicles such as linseed or other drying oils, apparently forming complex oil-lead-silica compounds with a portion of the oil. For example, when the pigment in water slurry is brought into contact with linseed oil, the oil and pigment react to form an oil-pigment paste which is neutral to litmus. The clear water set free is also neutral to litmus and is readily and substantially separable from the paste. This chemical reaction under ordinary circumstances quickly reaches completion as there is no evidence of secondary or after reactions upon aging the paste or paint made therefrom. As a result there are oil-pigment compounds present in the paste of different characteristics and in greater concentration than is the case when other known lead pigments such as basic carbonate white lead, basic sulfate white lead and lead titanate are brought into contact with drying oils under the same conditions.

The amorphous character of the new lead oxide-silicon dioxide pigments gives them stronger adsorptive powers than any others known to us. They can be readily dyed to deep toned fast colors with either oil soluble or water soluble dyes, including Congo Red, Methylene Blue, Bismark Brown, or Oil Red G, whereas the crystalline pigments adsorb similar dyes either weakly or not at all.

When used in paint the combined effect of the chemical reactivity and the strong adsorptive properties of the pigment is to produce dried films which are tougher, have better gloss and tint retention, together with longer life than any paint film known to us. We believe that in the drying of the paint film the excess of oil and possibly the oil pigment compounds present are polymerized to a considerable extent, since the dried films show much less solubility in organic solvents such as alcohol and acetone than any known outdoor paint films using drying oils as the vehicle.

Prior to our invention and discovery, high pigment volume ratio in outside paints employing lead pigments has been considered necessary in order to obtain the proper weathering characteristics. The accepted figure using the ordinary crystalline type of pigments is 28 to 32% of pigment by volume. The lowest pigment volume ratio recommended by any manufacturer for lead pigments is 24 to 25%. We have prepared paints containing our new pigment in pigment-volume ratios as low as 21%, and upon exposure have found they weather better in every respect than the ordinary type of outside paint with a higher pigment-volume ratio. We have also found that paints containing our new product mixed in small amounts with other well known pigments are considerably longer lived than are paints in which our products are absent. In this type of mixed pigment paint, as well as in paint where our pigment is used alone, we find that the pigment-volume ratio can be lowered without sacrificing weathering power. Another important characteristic of our pigment is its property of accelerating the drying of paints in which it is used. Where appreciable percentages of the pigment are used in paints, the amount of added drier can be reduced or eliminated altogether due to the effective drying action of the pigment.

In carrying out our invention, lead compounds, such as litharge, lead sulfate, or leady litharge and silica are fused together in a suitable furnace in the desired proportions, and the melt granulated by running into water. The resultant lead oxide-silicon dioxide compound is then charged into a suitable apparatus together with excess water where it combines with a small percentage of the water, being reduced to very fine particle size in part by the chemical reaction and in part by attrition from the agitation given the mass. The wet pulp is then dried at a temperature range of approximately 200 to 800° F. and pulverized. We have used successfully compounds of from 10% to 30% silica and 70 to 90% lead oxide content by weight.

By changing the percentage of silica we are enabled to obtain variations in specific gravity, hiding power and oil absorption. We may for instance vary the specific gravity of different pigment compositions as indicated below:

Table

| Example | PbO | SiO$_2$ | H$_2$O | Sp. gr. |
| --- | --- | --- | --- | --- |
| 1 | 85.50 | 11.11 | 3.39 | 6.53 |
| 2 | 83.17 | 14.68 | 2.15 | 5.90 |
| 3 | 79.11 | 19.79 | 1.10 | 5.58 |
| 4 | 73.88 | 24.62 | 1.50 | 5.41 |

We may use a wider range of variation of silica percentage than indicated above in producing pigments having the special characteristics demanded by the trade. We have found the hiding power of our new pigments to be similar to the hiding power of chemically analogous basic lead carbonates and basic lead sulfates. In the reaction step, we may vary the water content of the resultant product from approximately 1% by weight to as high as 10%, the amount of combined water being dependent upon the composition of the anhydrous lead oxide-silicon dioxide compound at the start of the process and the time and temperature of reaction. When the starting lead oxide-silicon dioxide compound is composed of approximately 15% by weight of silica and 85% by weight of lead oxide, and the reaction is carried out to an approximate 2% gain in weight, the resultant hydrous compound corresponds very closely to the formula $3PbO.2SiO_2.H_2O$, a composition chemically analogous to the preferred well known basic carbonate and wet processed basic sulfate of lead. When the starting lead oxide, silicon dioxide compound is higher in PbO content, we find the amount of combined water is usually greater under a given set of conditions, with a corresponding increase in oil absorption and hiding power over those compounds containing less lead oxide and combined water. The properties of our new pigments are analogous in many ways to the properties of the basic carbonate and wet processed basic sulfates of lead of similar compositions and therefore we believe that we have produced a whole new series of compounds of the system $PbO—SiO_2—H_2O$, which form paint pigments of greater stability and wider usefulness than the heretofore known lead pigments.

As a specific example of our process, we may fuse together 1700 pounds of lead monoxide and 300 pounds of silica sand in a reverberatory furnace at a temperature of approximately 1800° F. When fusion is complete, the fluid compound is allowed to run from the furnace into a large volume of water and the granular mass is then placed in a porox or porcelain lined ball mill charged with porox or porcelain balls together with 1500 pounds of water and ground for 24 hours. During the period of attrition the chemical reaction proceeds and at the end of the time the mass is filtered and dried at a temperature of approximately 220° F. and dry milled over an impact pulverizer. In addition to the water, we may add a catalyst such as acetic or any other acid which will react with lead oxide to form a soluble salt of lead. This causes a strong dispersing effect upon the pigment and tends to catalyze the chemical reaction, at the same time reducing the quantity of water required for proper grinding. After reaction is complete the soluble lead may be removed by precipitation, if desired.

In those cases where the fusions of lead oxide-silicon dioxide are yellowish colored glasses, we are enabled to produce a lead oxide-silicon dioxide product in the dry pulverized state which is white in color, exceedingly fine in particle size and strong in light refracting powers.

Under the microscope at 2000$x$ our new pigments appear as minute irregular shaped, fuzzy edged, amorphous particles with occasionally a vitreous sharp edged particle in evidence. Where the silica content of the initial lead oxide-silicon dioxide compound is high, for example, 25 to 30%, there are usually greater numbers of these vitreous particles present. Where the silica content is lower, the glass-like sharp edged particles are absent and all of the initial lead oxide-silicon dioxide compound appears to have reacted with water during the manufacturing process.

We have found that by varying the drying temperature we are enabled to control the oil absorption of the finished product to an appreciable degree without in any manner lessening the pigment properties of the finished product. The higher the temperature range the more complete is the elimination of combined water and the lower the oil absorption of the lead oxide-silicon dioxide compound. In carrying out experiments we have found that by using a temperature range of approximately 800° F. substantially all the combined water is eliminated, in which case we are enabled to reduce the oil absorption appreciably below that of a product dried at a lower temperature range.

This application is a continuation-in-part of our co-pending application, Serial No. 247,107, filed December 21, 1938.

Having thus described our invention, what we claim as new and desire to secure by Letters Patent is:

1. As a new composition of matter a pigment comprising a hydrated reaction product of a fused lead oxide-silicon dioxide compound having a molecular composition approximating $3PbO.2SiO_2.H_2O$.

2. As a new composition of matter a hydrated reaction product of a fused compound of lead oxide and silicon dioxide and characterized by a molecular structure within the approximate range $2PbO.SiO_2.H_2O$ to $3PbO.4SiO_2.H_2O$.

3. As a new composition of matter an amorphous paint pigment comprising the hydrated reaction product of a fused compound of lead oxide and silicon dioxide and having a silicon dioxide content from 10 to 30 per cent by weight, combined water from 1 to 10 per cent by weight and a lead oxide content from 60 to 89 per cent by weight.

4. A paint comprising a pigment content comprising an amorphous, hydrated reaction product of a fused lead oxide-silicon dioxide compound having a molecular structure within the approximate range $$2PbO.SiO_2.H_2O \text{ to } 3PbO.4SiO_2.H_2O$$

together with a paint vehicle.

5. A paint comprising a pigment content comprising an amorphous compound of lead oxide and silicon dioxide formed from the system $PbO.SiO_2.H_2O$ and having a molecular structure within the approximate range $$2PbO.SiO_2.H_2O \text{ to } 3PbO.4SiO_2.H_2O$$

6. A paint comprising a pigment content comprising an amorphous hydrated reaction product of a fused lead oxide-silicon dioxide compound having a molecular structure within the approximate range $$2PbO.SiO_2.H_2O \text{ to } 3PbO.4SiO_2.H_2O$$

together with a paint vehicle and basic lead carbonate.

7. A paint comprising a pigment content comprising an amorphous hydrated reaction product of a fused compound of lead oxide and silicon dioxide having a molecular structure within the approximate range $$2PbO.SiO_2.H_2O \text{ to } 3PbO.4SiO_2.H_2O$$

together with a paint vehicle and basic lead sulphate.

8. A paint comprising a pigment content comprising an amorphous hydrated reaction product of a fused compound of lead oxide and silicon dioxide having a molecular structure within the approximate range $$2PbO.SiO_2.H_2O \text{ to } 3PbO.4SiO_2.H_2O$$

together with a paint vehicle and a secondary pigment.

FORREST L. TURBETT.
GEORGE J. VAHRENKAMP.